United States Patent [19]
Sunohara et al.

[11] Patent Number: 5,901,802
[45] Date of Patent: May 11, 1999

[54] HYDRAULIC PASSAGES FOR OIL PUMP FOR SPEED REDUCER USED IN ELECTRIC VEHICLES

[75] Inventors: Yoshio Sunohara; Tozo Yamada; Akihiro Morita, all of Nagoya; Hiroyoshi Ario, Yokohama, all of Japan

[73] Assignees: Nissan Motor Co., Ltd., Yokohama; Aichi Machine Industry Co., Ltd., Nagoya, both of Japan

[21] Appl. No.: 08/856,610

[22] Filed: May 15, 1997

[30]  Foreign Application Priority Data

May 17, 1996 [JP] Japan .................................. 8-123034

[51] Int. Cl.$^6$ .............................. B60K 1/00; F04B 19/04; F01M 9/00
[52] U.S. Cl. ........................ 180/65.6; 137/512; 137/565; 184/6.12; 210/136; 210/168; 417/315; 418/32
[58] Field of Search ..................................... 210/136, 168, 210/171; 184/6.12, 6.24; 180/65.5, 65.6, 65.1, 65.7; 475/149, 153; 137/565, 512, 857, 899.1; 417/423.1, 423.9, 315; 418/32

[56]  References Cited

U.S. PATENT DOCUMENTS

| | | | |
|---|---|---|---|
| 1,035,449 | 8/1912 | Kinney ...................................... | 418/32 |
| 3,770,074 | 11/1973 | Sherman ................................. | 180/65.6 |
| 3,812,928 | 5/1974 | Rockwell et al. ...................... | 180/65.5 |
| 4,950,213 | 8/1990 | Morisawa ............................... | 184/6.12 |
| 5,111,090 | 5/1992 | Otake et al. ............................ | 310/54 |
| 5,127,485 | 7/1992 | Wakuta et al. ......................... | 180/65.5 |
| 5,156,579 | 10/1992 | Wakuta et al. ......................... | 180/65.5 |
| 5,372,213 | 12/1994 | Hasebe et al. .......................... | 180/65.6 |
| 5,655,983 | 8/1997 | Dick .......................................... | 418/32 |
| 5,718,302 | 2/1998 | Hasebe et al. .......................... | 180/65.6 |

*Primary Examiner*—Joseph W. Drodge
*Attorney, Agent, or Firm*—Foley & Lardner

[57] ABSTRACT

Hydraulic passages for an oil pump for a speed reducer used in electric vehicle include a first passage for connecting an inlet port of an oil pump to an oil reservoir through a first check valve, a second passage for connecting an outlet port of the oil pump to a discharged-oil demand part through a second check valve, a third passage for connecting the outlet port to the oil reservoir through a third check valve, and a fourth passage for connecting the inlet port to the discharged-oil demand part through a fourth check valve. The check valves are disposed such that, upon normal rotation of the oil pump, the first and second check valves are opened, and upon reverse rotation thereof, the third and fourth check valves are opened.

4 Claims, 8 Drawing Sheets

HYDRAULIC PASSAGES FOR OIL PUMP FOR SPEED REDUCER USED IN ELECTRIC VEHICLES

BACKGROUND OF THE INVENTION

The present invention relates to hydraulic passages for an oil pump for a speed reducer used in electric vehicles.

There is an electric vehicle including an oil pump which is synchronously driven in the direction of rotation of a motor. In this electric vehicle which further includes a speed reducer coaxially disposed with respect to the motor, the oil pump is driven by rotation of the motor to produce a negative pressure under which liquid is sucked from a liquid reservoir arranged in a speed-reducer casing, and is discharged to a discharged-oil demand part.

With the speed reducer without a reverse gear, for example, switching of forward and reverse runs of the vehicle is carried out by switching of normal and reverse rotations of the motor. Thus, rotation of the oil pump is opposed upon forward and reverse runs of the vehicle, failing to supply an appropriate amount of discharged oil.

One of the solutions is, as seen in the Manual of New Model Car NISSAN TERRANO R50-0, p. C-30, published by Nissan Motor, Co., Ltd. in September, 1995, to provide another oil pump for reverse. However, this solution needs another control of the oil pumps or complicated arrangement of hydraulic passages for connecting the oil pumps.

It is, therefore, an object of the present invention to provide hydraulic passages for an oil pump for a speed reducer used in electric vehicles, which allow the oil pump, which is synchronously driven in the direction of rotation of a motor, to ensure a predetermined quantity of flow regardless of the direction of rotation of the motor.

SUMMARY OF THE INVENTION

According to an aspect of the present invention, there is provided, in an electric vehicle driven by a motor:

a casing;

a reservoir disposed in said casing, said reservoir serving to reserve liquid;

a pump disposed in said casing, said pump being synchronously driven in a direction of rotation of the motor, said pump serving to suck liquid in said reservoir by a negative pressure due to pump operation and discharge it to a discharged-liquid demand part, said pump including inlet and outlet ports;

first passage means for defining a passage for connecting said inlet port to said reservoir through a first check valve;

second passage means for defining a passage for connecting said outlet port to said discharged-liquid demand part through a second check valve;

third passage means for defining a passage for connecting said outlet port to said reservoir through a third check valve; and fourth passage means for defining a passage for connecting said inlet port to said discharged-liquid demand part through a fourth check valve, said check valves being disposed such that, upon normal rotation of said pump, said first and second check valves are opened, and upon reverse rotation of said pump, said third and fourth check valves are opened.

DETAILED DESCRIPTION OF THE INVENTION

Figure 1:
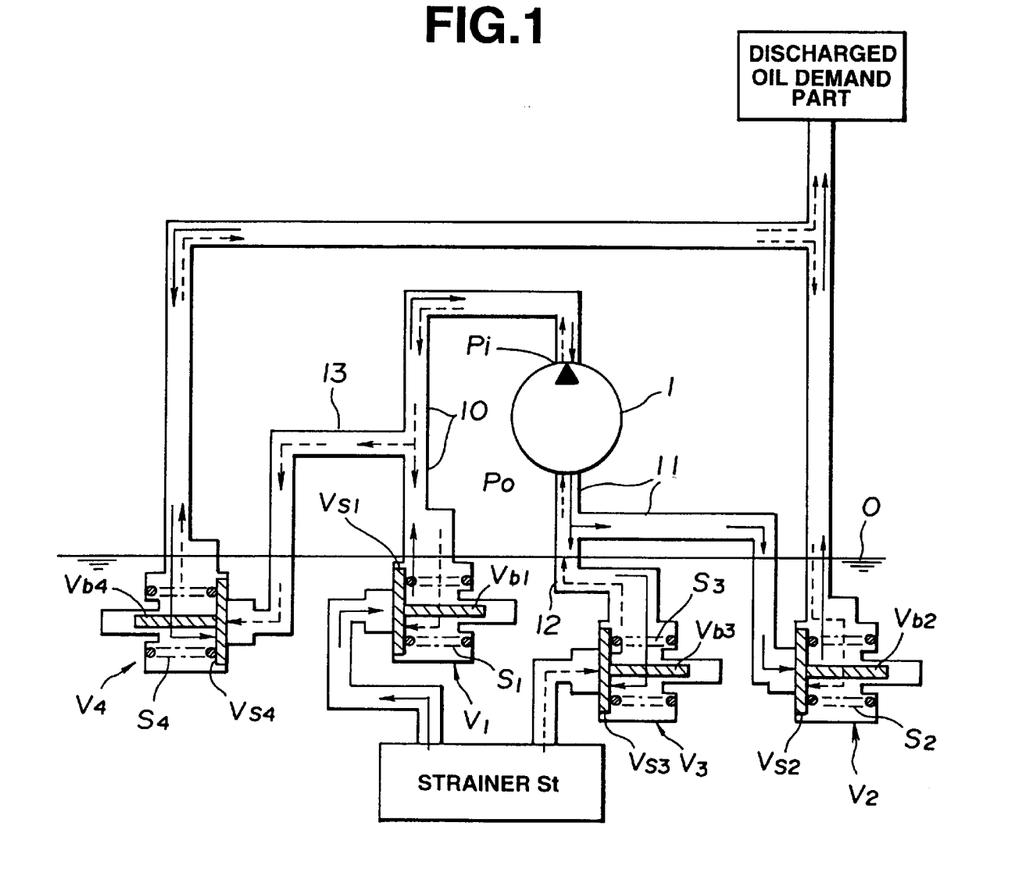
FIG. 1 is a schematic diagram showing an embodiment of hydraulic passages for an oil pump for a speed reducer used in electric vehicles according to the present invention.

Referring to the drawings wherein like reference numerals designate like parts throughout the views, a description will be made with regard to hydraulic passages for an oil pump for a speed reducer used in electric vehicles embodying the present invention. Referring to FIG. 1, arranged in a speed-reducer casing are an oil pump 1 synchronously driven in the direction of rotation of a motor, an oil reservoir for reserving oil O as used for lubricating or working oil, and a strainer St arranged in the oil reservoir and connected to the oil pump 1.

An inlet port Pi of the oil pump 1 is connected to the strainer St by a first suction passage 10 provided with a first check valve V1. An outlet port Po of the oil pump 1 is connected to a discharged-oil demand part by a first discharge passage 11 provided with a second check valve V2. The first discharge passage 11 between the outlet port Po and the second check valve V2 is connected to the strainer St by a second suction passage 12 provided with a third check valve V3. The first suction passage 10 between the inlet port Pi and the first check valve V1 is connected to the discharged-oil demand part by a second discharge passage 13 provided with a fourth check valve V4.

Figure 2:
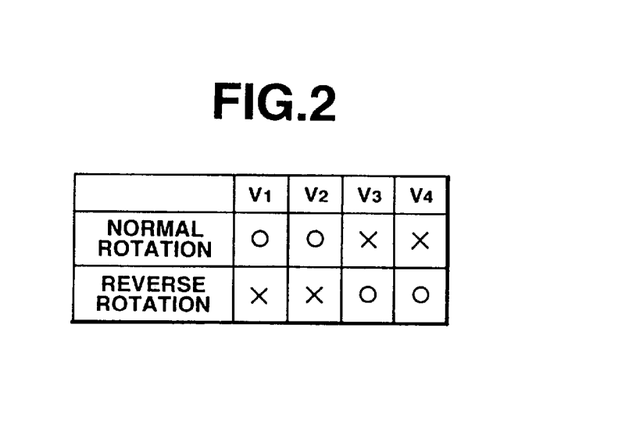
FIG. 2 is a table showing opening and closing of check valves with respect to the direction of rotation of the oil pump.

The check valves V1–V4 are arranged such that normal rotation of the oil pump 1 makes only the first and second check valves V1–V2 open, and reverse rotation of the oil pump 1 makes only the third and fourth check valves V3–V4 open. Specifically, referring to FIG. 2, upon normal rotation of the oil pump 1, the first and second check valves V1–V2 are opened, and the third and fourth check valves V3–V4 are closed. On the other hand, upon reverse rotation of the oil pump 1, the third and fourth check valves V3–V4 are opened, and the first and second check valves V1–V2 are closed.

Thus, referring to FIG. 1, upon normal rotation, the oil pump 1 sucks oil O filtered by the strainer St from the outlet port Pi through the first check valve V1 as indicated by a fully-drawn line, which is supplied from the outlet port Po to the discharged-oil demand part through the second check valve V2. At this time, since the third and fourth check valves V3–V4 are closed, there is no loss of sucked oil through the second discharge passage 13, nor counter flow of discharged oil from the second suction passage 12 to the strainer St.

On the other hand, referring to FIG. 1, upon reverse rotation, the oil pump 1 sucks oil O filtered by the strainer St from the outlet port Po through the third check valve V3 as indicated by a broken line, which is supplied from the inlet port Pi to the discharged-oil demand part through the fourth check valve V4. At this time, since the first and second check valves V1–V2 are closed, there is no loss of sucked oil through the first discharge passage 11, nor counter flow of discharged oil from the first suction passage 10 to the strainer St.

The check valves V1–V4, which may be of various types, are preferably a flap valve including a valve plug Vb, a valve seat Vs, and a spring S. When the oil pump 1 is not driven, the flap valve is closed by seating the valve plug Vb on the valve seat Vs by a biasing force of the spring S. On the other hand, when the oil pump 1 is driven, the flap valve is opened by separating the valve plug Vb from the valve seat Vs as soon as a negative or positive pressure due to pump operation exceeds a biasing force of the spring S.

When the flap valves serve as the check valves V1–V4, similar operation is carried out. That is, upon normal rotation of the oil pump 1, the first flap valve V1 is opened by a valve plug Vb1 thereof receiving as a back pressure a negative pressure due to pump operation so as to suck oil O in the inlet port Pi through the strainer St. Then, discharged oil from the outlet port Po makes the second flap valve V2 open to supply oil O to the discharged-oil demand part. At this time, the third flap valve V3 is kept closed by seating a valve plug Vb3 on a valve seat Vs3 by a biasing force of a spring S1, and the fourth flap valve V4 is also kept closed by seating a valve plug Vb4 on a valve seat Vs4 by a biasing force of a spring S4, resulting in no loss of oil O through the passages.

Likewise, upon reverse rotation of the oil pump 1, the third flap valve V3 is opened by a negative pressure due to pump operation so as to suck oil O in the outlet port Po through the strainer St. Then, discharged oil from the inlet port Pi makes the fourth flap valve V4 open to supply oil O to the discharged-oil demand part. At this time, the first flap valve V1 is kept closed by seating the valve plug Vb1 on the valve seat Vs1 by a biasing force of the spring S1, and the second flap valve V2 is also kept closed by seating the valve plug Vb2 on the valve seat Vs2 by a biasing force of the spring S2, resulting in no loss of oil O through the passages.

Figure 3:
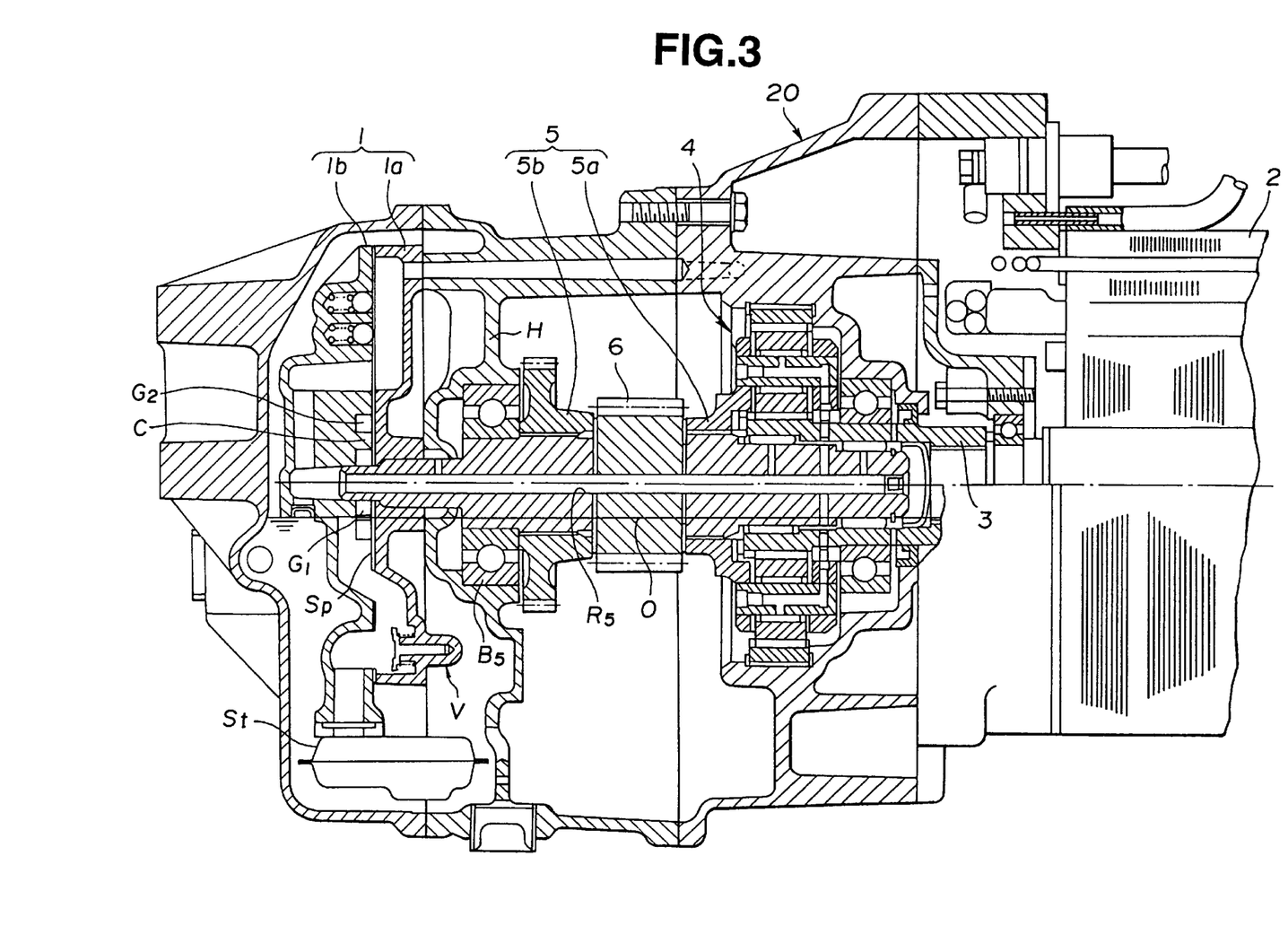
FIG. 3 is a longitudinal section, as viewed from the side, showing a power train of an electric vehicle to which the present invention is applied.

Referring next to FIG. 3, a concrete example of hydraulic passages for an oil pump will be described. Referring to FIG. 3, a power train of an electric vehicle comprises a three-phase induction motor 2 as a power source, and a speed-reducer casing 20 constructed by casing members and having therein an oil pump 1 synchronously driven in the direction of rotation of the motor 2 and a planetary-gear speed reducer 4 for reducing rotation of the motor 2. The planetary-gear speed reducer 4 has no reverse gear drivingly connected to the motor 2 through an input shaft 3. Forward or reverse run of the vehicle is ensured by switching of the direction of rotation of the motor 2.

The oil pump 1 comprises a valve body/pump cover 1a having hydraulic passages and flap valves V1–V4, and a pump housing 1b formed with a cavity with a crescent C which are integrated with each other through a packing Sp. Accommodated in the cavity of the pump housing 1b are an inner gear G1 drivingly connected to a drive shaft 5 of the planetary-gear speed reducer 4, and an outer gear G2 circumscribed and meshed with the inner gear G1. The oil pump 1 is connected to a strainer St immersed in oil O held in the speed-reducer casing 20. The drive shaft 5 is formed with a hydraulic passage R5 for supplying lubricating or working oil to the planetary-gear speed reducer 4, and has a gear 6 integrated therewith.

Figure 4:
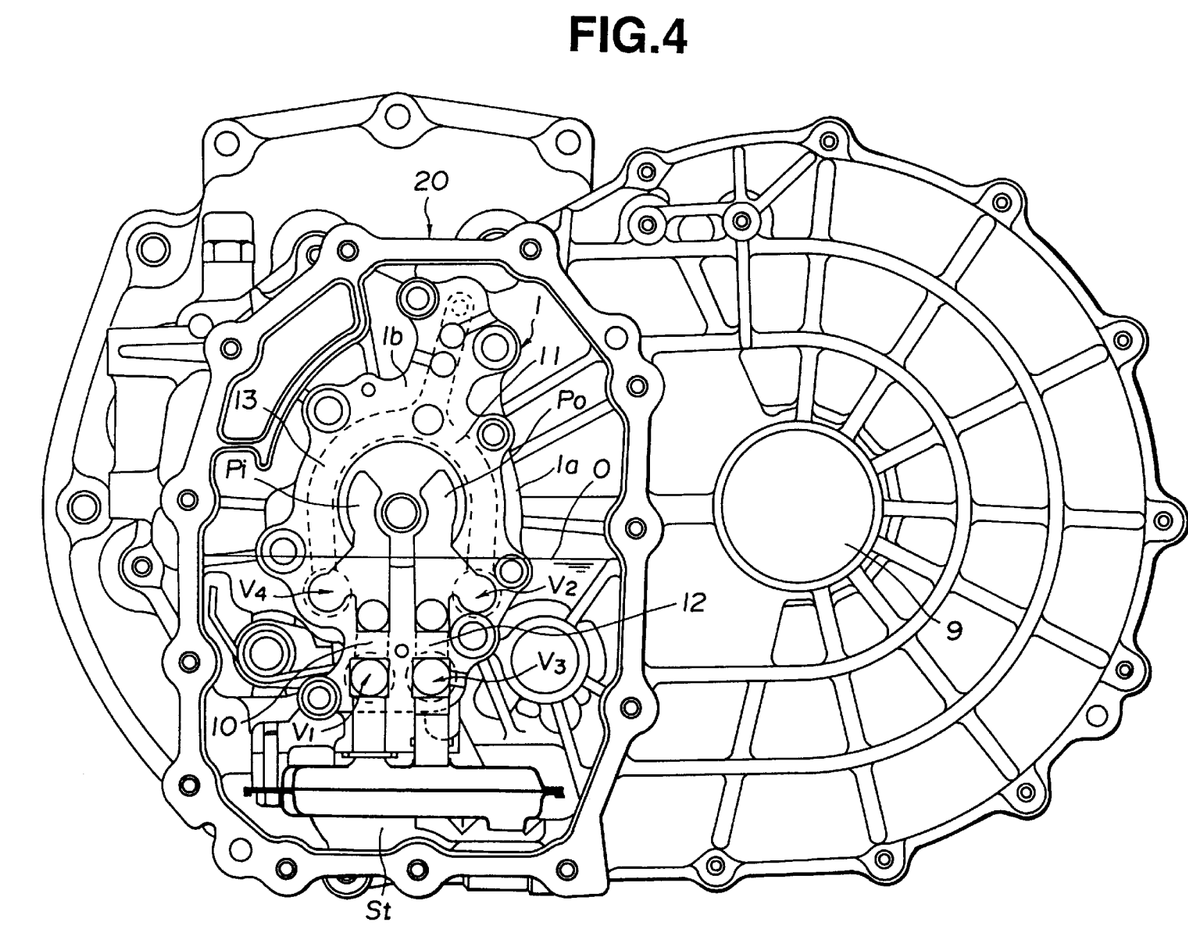
FIG. 4 is a side view showing the power train of the vehicle as viewed from the output side opposite to the input side to which a motor is mounted.

Referring to FIG. 4, as for the direction of rotation of the oil pump 1, suppose that clockwise rotation as viewed in FIG. 4 is a normal rotation, and counterclockwise rotation as viewed in FIG. 4 is a reverse rotation. The flap valves V1–V4 mounted to the pump cover 1a are immersed in oil O when the vehicle is at a standstill. Accommodated in the speed-reducer casing 20 in the right portion as viewed in FIG. 4 is a differential gear 8 which receives reduced rotation of the planetary-gear speed reducer 4 from the gear 6 as shown in FIG. 3.

Figure 5:
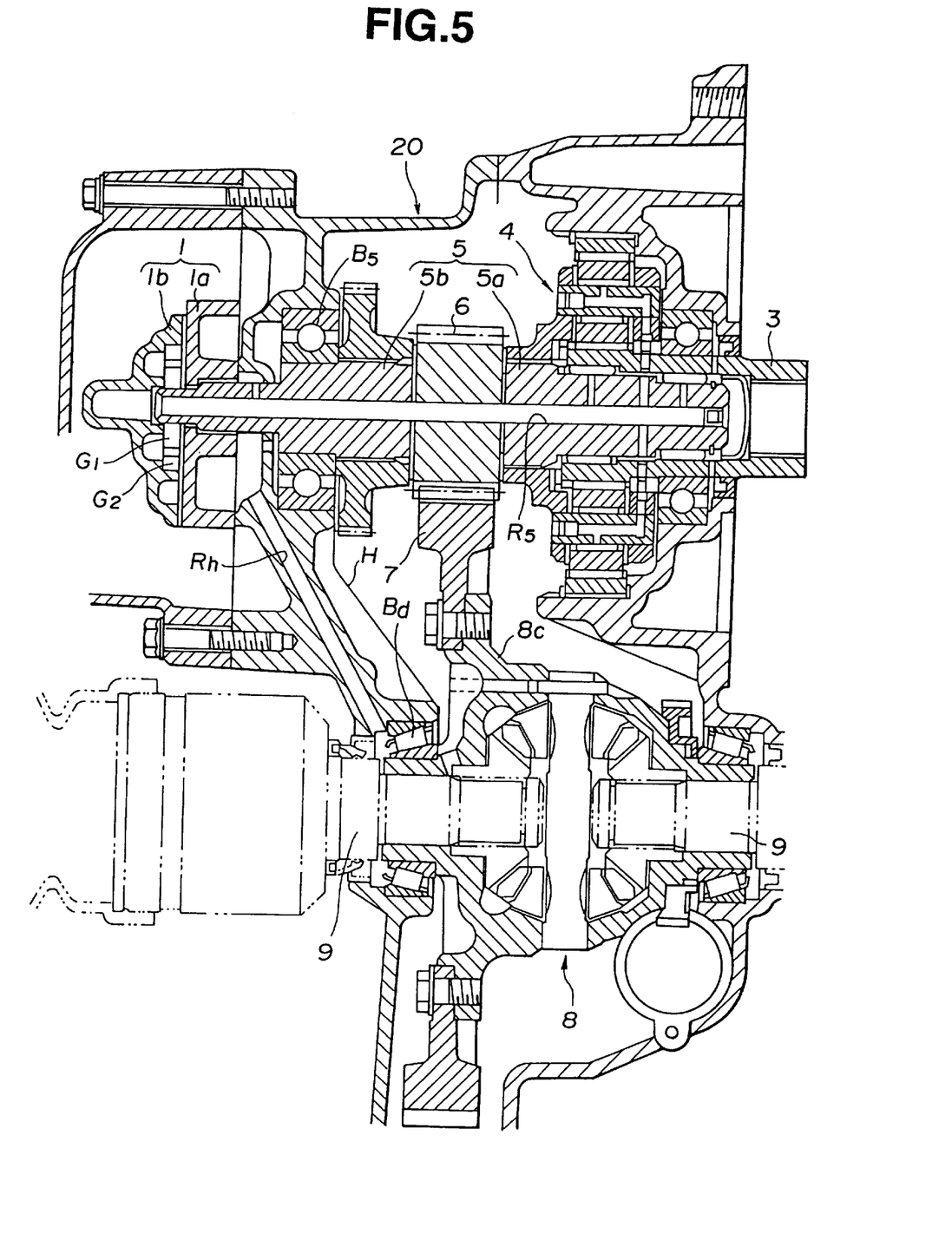
FIG. 5 is a view similar to FIG. 3, as viewed from above, showing the power train of the vehicle.

Referring to FIG. 5, the differential gear 8 comprises a differential-gear casing 8C to which a final drive gear comprising the gear 6 and a ring gear 7 is fixedly mounted. Moreover, the speed-reducer casing 20 includes a support wall H which rotatably supports the differential casing 8C and the drive shaft 5 through a bearing B. The support wall H is formed with a hydraulic passage Rh through which oil O discharged from the oil pump 1 is supplied to a bearing Bd for supporting the differential casing 8C.

The power train of the vehicle is constructed such that, upon operation of the motor 2 as a power source, rotation of the motor 2 is input to the planetary-gear speed reducer 4 through the input shaft 3. The planetary-gear speed reducer 4 outputs reduced rotation to the drive shaft 5, which is transmitted to the ring gear 7 meshed with the gear 6, thus driving an axle shaft 9 of the differential gear 8.

At this time, the oil pump 1 is also driven by reduced rotation of the drive shaft 5 to rotate the inner gear G1 together with the outer gear G2. This increases the volume of a space formed at a meshed portion of the gears G1–G2 to suck oil O in the oil pump 1 through the strainer St, then decreases the above volume to discharge oil O to the discharged-oil demand part.

Figure 6:
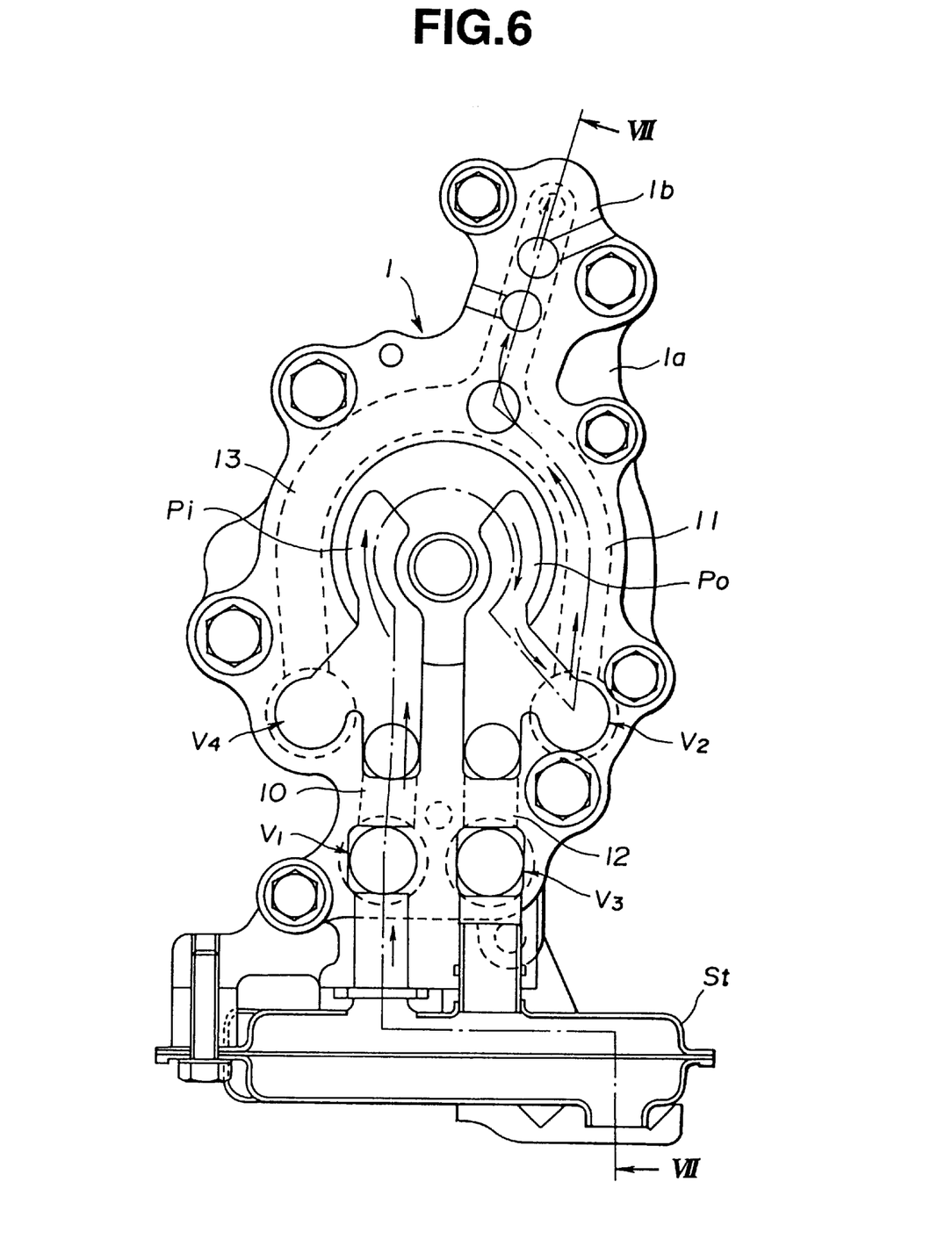
FIG. 6 is a view similar to FIG. 4, showing the hydraulic passages for the oil pump as viewed from the output side opposite to the input side to which the motor is mounted.
Figure 7:
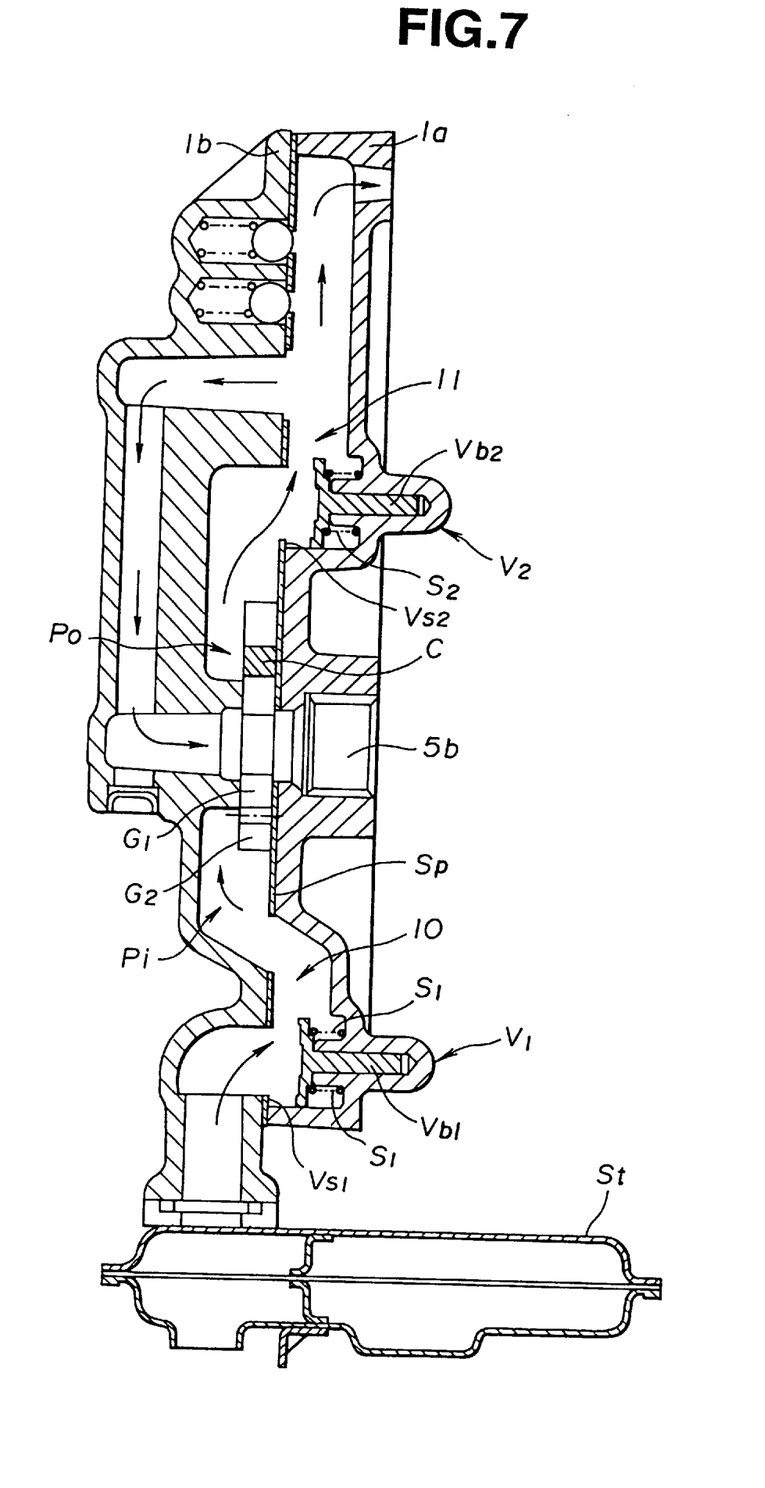
FIG. 7 is a sectional view taken along the line VII—VII in FIG. 6.
Figure 8:
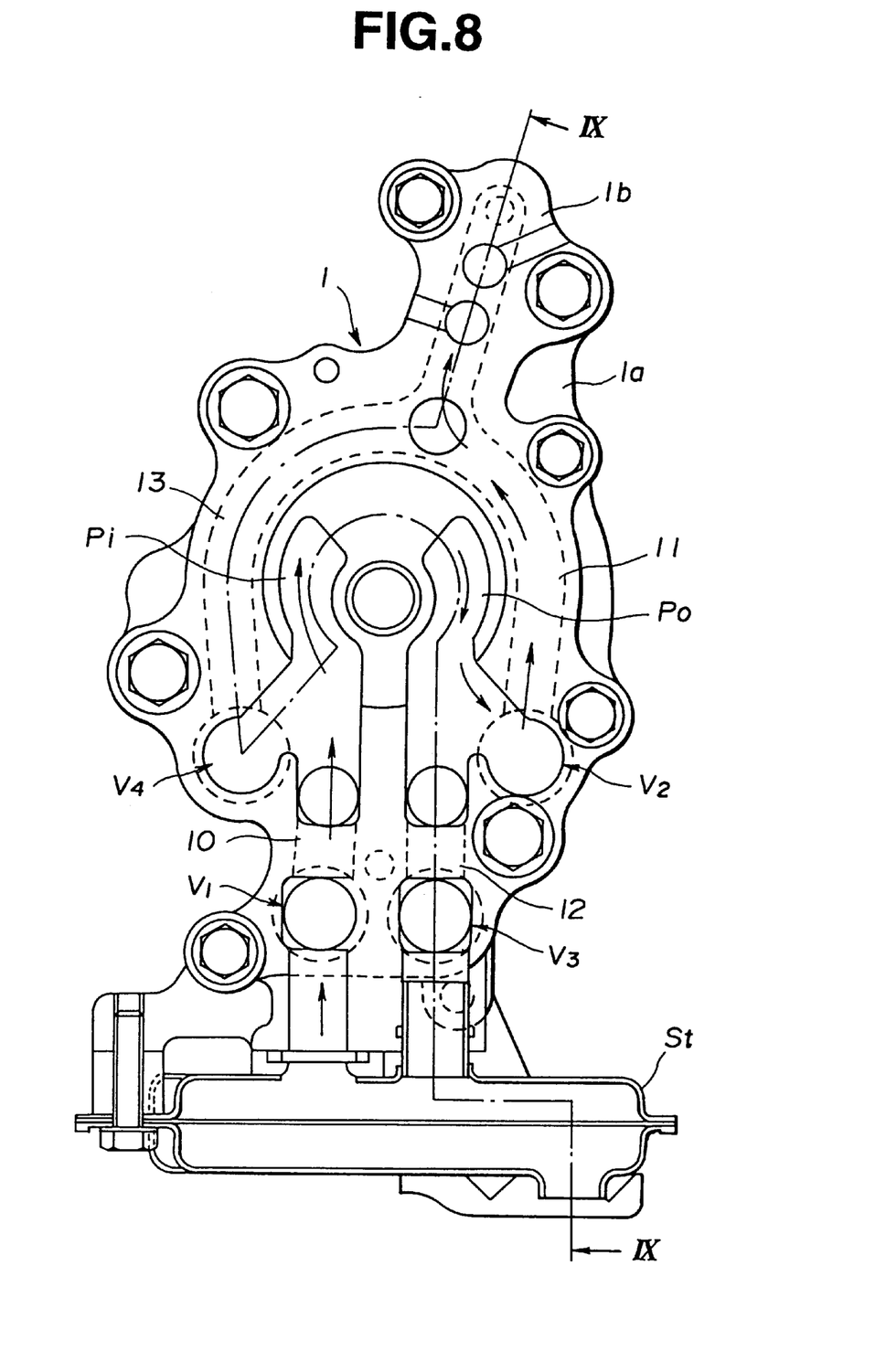
FIG. 8 is a view similar to FIG. 6, showing the hydraulic passages for the oil pump as viewed from the output side opposite to the input side to which the motor is mounted.

FIGS. 6 and 8 are the same view showing the oil pump 1 and the strainer St with oil O flowing in the direction of arrows upon normal rotation of the oil pump 1. In this connection, FIG. 7 is a sectional view taken along the line VII—VII in FIG. 6, and FIG. 9 is a sectional view taken along the line IX—IX in FIG. 8.

Referring to FIGS. 6–7, upon normal rotation of the oil pump 1 together with the motor 2 for forward run of the vehicle, the first flap valve V1 is opened by the valve plug Vb1 thereof receiving as a back pressure a negative pressure due to pump operation so as to suck oil O in the inlet port Pi through the strainer St. Then, discharged oil from the outlet port Po makes the second flap valve V2 open to supply, through the hydraulic passage Rh of the support wall H and the hydraulic passage R5 of the drive shaft 5, oil O as used for lubricating or working oil to the discharged-oil demand part, i.e. the bearing Bd of the differential gear 8 and a lubricating-oil demand part of the planetary-gear speed reducer 4, or a hydraulic unit for actuating the planetary-gear speed reducer 4.

Figure 9:
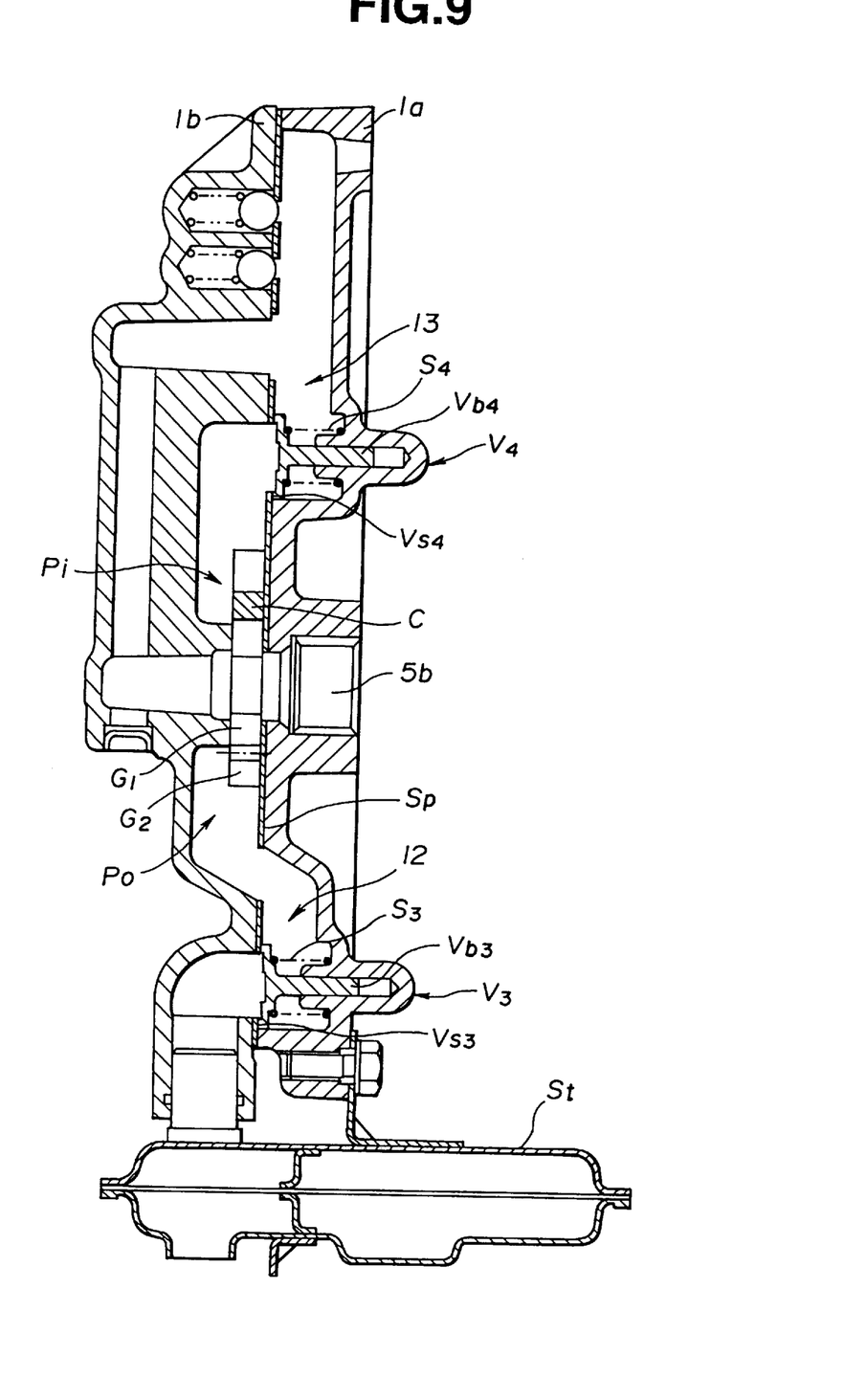
FIG. 9 is a view similar to FIG. 7, taken along the line IX—IX in FIG. 8.

Referring to FIGS. 8–9, at this time, the third flap valve V3 is kept closed by seating the valve plug Vb3 on the valve seat Vs3 by a biasing force of the spring S1, and the fourth flap valve V4 is also kept closed by seating the valve plug Vb4 on the valve seat Vs4 by a biasing force of the spring S4, resulting in no flowing-out of oil O through the second suction passage 12 and the second discharge passage 13.

On the other hand, upon reverse rotation of the oil pump 1 together with the motor 2 for reverse run of the vehicle, operation of the first and second flap valves V1–V2, and that of the third and fourth flap valves V3–V4 are carried out in the opposite way to that as described above.

Thus, the hydraulic passages for a speed reducer used in electric vehicles according to the present invention allow a predetermined flow rate of oil O with a single oil pump 1 and regardless of the direction of rotation of the motor 2 even when the direction of rotation should be changed because of the planetary-gear speed reducer 4 with no reverse gear, etc.

Further, when the vehicle is at a standstill, the check valves V1–V4 are immersed in oil O, preventing leakage of oil O from the check valves V1–V4, resulting in improved sealing thereof.

Furthermore, since the check valves V1–V4 are disposed on the same plane perpendicular to an axis of the oil pump 1, they can integrally be accommodated in the pump cover 1b, simplifying the structure of the hydraulic passages for the oil pump, resulting in easy assembling work thereof.

Still further, when the flap valves serve as the check valves V1–V4, the simple structure can be obtained since the flap valve includes only the valve plug Vb, valve seat Vs. and spring S, resulting in easy assembling work thereof.

Having described the present invention in connection with the preferred embodiment, it is noted that the present invention is not limited thereto, and various changes and modifications can be made without departing from the spirit of the present invention. By way of example, the oil pump 1 may be of the vane type. Moreover, the oil pump 1 may be disposed between the planetary-gear speed reducer 4 and the gear 6 in the same way as in engine vehicles.

What is claimed is:

1. In an electric vehicle driven by a motor:

a speed reducer;

a casing for said speed reducer;

a reservoir disposed in said casing, said reservoir serving to reserve liquid;

a pump disposed in said casing, said pump being synchronously driven in a direction of rotation of the motor, said pump serving to suck liquid in said reservoir by a negative pressure due to pump operation and discharge liquid to a discharged-liquid demand part, said pump including inlet and outlet ports;

a first passage connecting said inlet port to said reservoir;

a second passage connecting said outlet port to said discharged-liquid demand part;

a third passage connecting said outlet port to said reservoir;

a fourth passage connecting said inlet port to said discharged-liquid demand part;

a first check valve arranged with said first passage;

a second check valve arranged with said second passage;

a third check valve arranged with said third passage; and a fourth check valve arranged with said fourth passage, only said first and second check valves being opened upon a first direction of rotation of said pump, only said third and fourth check valves being opened upon reverse rotation of said pump.

2. In an electric vehicle as claimed in claim 1, wherein said check valves are immersed in liquid within said reservoir when the electric vehicle is at a standstill.

3. In an electric vehicle as claimed in claim 2, wherein said check valves are disposed on the same plane perpendicular to an axis of said pump.

4. In an electric vehicle as claimed in claim 3, wherein said check valves include a flap valve comprising a valve plug seated on a valve seat by a biasing force of a spring, said valve plug being opened when undergoing a pressure greater than said biasing force.

* * * * *